United States Patent
Gretz (10) Patent No.: US 11,050,230 B1
(45) Date of Patent: Jun. 29, 2021

(54) ELECTRICAL BOX FOR MOUNTING AN ELECTRICAL DEVICE OR FIXTURE ON A SUSPENDED CEILING T-BAR OR INTERSECTION OF A T-BAR GRID

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 136 days.

(21) Appl. No.: 16/369,044

(22) Filed: Mar. 29, 2019

Related U.S. Application Data (60) Provisional application No. 62/695,352, filed on Jul. 9, 2018.

(51) Int. Cl.
  *H02G 3/12* (2006.01)
  *E04B 9/00* (2006.01)
  *H02G 3/08* (2006.01)
  *H02G 3/14* (2006.01)

(52) U.S. Cl.
  CPC .............. *H02G 3/12* (2013.01); *E04B 9/006* (2013.01); *H02G 3/085* (2013.01); *H02G 3/14* (2013.01)

(58) Field of Classification Search
  CPC .................. F21V 21/04; H02G 3/12
  See application file for complete search history.

(56) References Cited

U.S. PATENT DOCUMENTS

| | | | | |
|---|---|---|---|---|
| 2,824,217 A * | 2/1958 | Karolejohnj | ............. | F21S 8/02 362/294 |
| 2,855,503 A * | 10/1958 | Gerstel | ................... | F21S 8/02 362/273 |
| 4,232,361 A * | 11/1980 | Kelsall | ................... | F21S 8/026 362/269 |
| 6,107,568 A * | 8/2000 | Schnell | .................... | H02G 3/20 174/54 |
| 6,889,943 B2 * | 5/2005 | Dinh | ..................... | B60N 2/073 248/343 |
| 6,967,284 B1 * | 11/2005 | Gretz | ..................... | H02G 3/125 174/50 |
| 7,108,394 B1 * | 9/2006 | Swarens | .................. | F21S 8/02 362/147 |
| 7,148,420 B1 * | 12/2006 | Johnson | ................ | H02G 3/125 174/58 |
| 7,307,214 B1 * | 12/2007 | Gretz | ..................... | H02G 3/20 174/54 |

(Continued)

Primary Examiner — William H. Mayo, III
Assistant Examiner — Krystal Robinson (57) ABSTRACT

An electrical box assembly including an electrical box having an open end, a closed end, and intersecting channels that facilitate easy mounting to the T-bar grid of a suspended ceiling. The channels are open at the open end of the box and closed at their opposing ends. The box can be fitted upon the T-bar grid by simply aligning a channel of the box with the top of the T-bar and pressing the box upon downward onto the T-bar. The channels seat on the T-bar base and level the open end of the electrical box with the ceiling tile. The box can also be fitted at the intersection of two T-bars. The electrical box may include one or more breakaway tabs on the open ends of the channels to facilitate adjusting the height of the box on a T-bar for use with premium/reveal edge ceiling tiles.

12 Claims, 11 Drawing Sheets

(56) References Cited

U.S. PATENT DOCUMENTS

| | | | | |
|---|---|---|---|---|
| 7,518,059 B2* | 4/2009 | Herth | ............... | F21V 21/03 |
| | | | | 174/58 |
| 7,586,039 B1* | 9/2009 | Gretz | ............... | F21V 21/04 |
| | | | | 174/58 |
| 7,735,794 B1* | 6/2010 | Gretz | ............... | E04B 9/006 |
| | | | | 248/343 |
| 8,091,721 B1* | 1/2012 | Gretz | ............... | H02G 3/125 |
| | | | | 220/3.9 |
| 8,967,575 B1* | 3/2015 | Gretz | ............... | H05K 5/0204 |
| | | | | 248/343 |
| 9,435,353 B1* | 9/2016 | Gretz | ............... | F04D 29/646 |
| 9,735,557 B1* | 8/2017 | Gretz | ............... | H02G 3/125 |
| 9,887,524 B1* | 2/2018 | Gretz | ............... | H02G 3/14 |
| 10,103,533 B1* | 10/2018 | Gretz | ............... | H02G 3/38 |
| 10,233,640 B1* | 3/2019 | Russell | ............... | E04B 9/18 |
| 10,473,306 B2* | 11/2019 | Feit | ............... | F21S 8/061 |
| 10,760,777 B2* | 9/2020 | Krieger | ............... | F21V 23/06 |
| 2009/0279298 A1* | 11/2009 | Mier-Langner | ............... | H01R 13/6205 |
| | | | | 362/235 |
| 2011/0309751 A1* | 12/2011 | Ter-Hovhannisyan | ............... | |
| | | | | F21V 29/773 |
| | | | | 315/113 |
| 2014/0238717 A1* | 8/2014 | Korcz | ............... | H02G 15/06 |
| | | | | 174/50 |
| 2016/0116118 A1* | 4/2016 | Bernard | ............... | F21K 9/27 |
| | | | | 362/224 |
| 2017/0082253 A1* | 3/2017 | Sorensen | ............... | F21V 21/34 |
| 2017/0307198 A1* | 10/2017 | Shah | ............... | F21V 5/04 |
| 2018/0115131 A1* | 4/2018 | Kohen | ............... | H01R 13/7038 |
| 2018/0356056 A1* | 12/2018 | Phillips | ............... | F21V 17/164 |
| 2019/0145590 A1* | 5/2019 | Brothwell | ............... | F21S 8/03 |
| | | | | 362/147 |

* cited by examiner

ELECTRICAL BOX FOR MOUNTING AN ELECTRICAL DEVICE OR FIXTURE ON A SUSPENDED CEILING T-BAR OR INTERSECTION OF A T-BAR GRID

CROSS-REFERENCE TO RELATED APPLICATIONS

This application claims the benefit of provisional U.S. Application No. 62/695,352, filed Jul. 9, 2018, the contents of which are incorporated herein in their entirety.

FIELD OF THE INVENTION

This invention relates to electrical boxes and specifically to an electrical box assembly for mounting a fan or light fixture to the T-bar grid of a suspended ceiling.

BACKGROUND OF THE INVENTION

Suspended ceilings typically include crossing T-bars that form a grid for supporting a plurality of ceiling tiles. Conventional electrical boxes are commonly used for mounting electrical devices, such as fans and light fixtures, to the suspended ceiling. When mounting a conventional electrical box to a suspended ceiling, an installer typically forms an opening in the ceiling tile and mounts the electrical box in the opening. The electrical box is typically mounted with the open end of the box substantially level with the ceiling tile. As there is little structural strength in the suspended tile, the electrical box is typically anchored with a steel cable or drop wire to an overhead support in order to support the weight of the electrical device. Unfortunately, it is difficult to level the open end of the electrical box with the ceiling tile while at the same time adjusting the tension of the anchored steel cable or drop wire.

Accordingly, what is needed is an electrical box assembly that can be easily leveled with and mounted to a suspended ceiling.

BRIEF SUMMARY OF THE INVENTION

The invention is an electrical box assembly for mounting an electrical component in a suspended ceiling. The electrical box assembly includes a box having an open end and one or more channels that facilitate easy mounting to the T-bar grid of the suspended ceiling. The channels are open at the open end of the box and closed at their opposing ends. Preferably two intersecting channels extend through the box at substantially a 90-degree angle to one another. The box can be fitted upon the T-bar grid by simply aligning a channel of the box with the top of the T-bar and pressing the box upon downward onto the T-bar. The channels seat on the T-bar base and level the open end of the electrical box with the ceiling tile. The box can also be fitted at the intersection of two T-bars. The electrical box may include one or more breakaway tabs on the open ends of the channels to facilitate adjusting the height of the box on a T-bar for use with premium/reveal edge ceiling tiles.

OBJECTS AND ADVANTAGES

It is accordingly an object of the invention to provide an electrical box for mounting devices to suspended ceiling grids.

A further object of the invention is to enable positioning a device on a suspended ceiling grid at the intersection of the T-rails or on the straight away portions.

As another object of the invention, for use on premium/reveal edge tiles, the box height adjusts by removing tabs within the electrical box.

As a further object the electrical box provides a cost-effective way to mount a fan or fixture, smoke or carbon monoxide detector, security camera, exit sign, or emergency lighting on a suspended ceiling grid.

These and other objects of the invention will be obvious in view of the following description and with reference to the accompanying drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
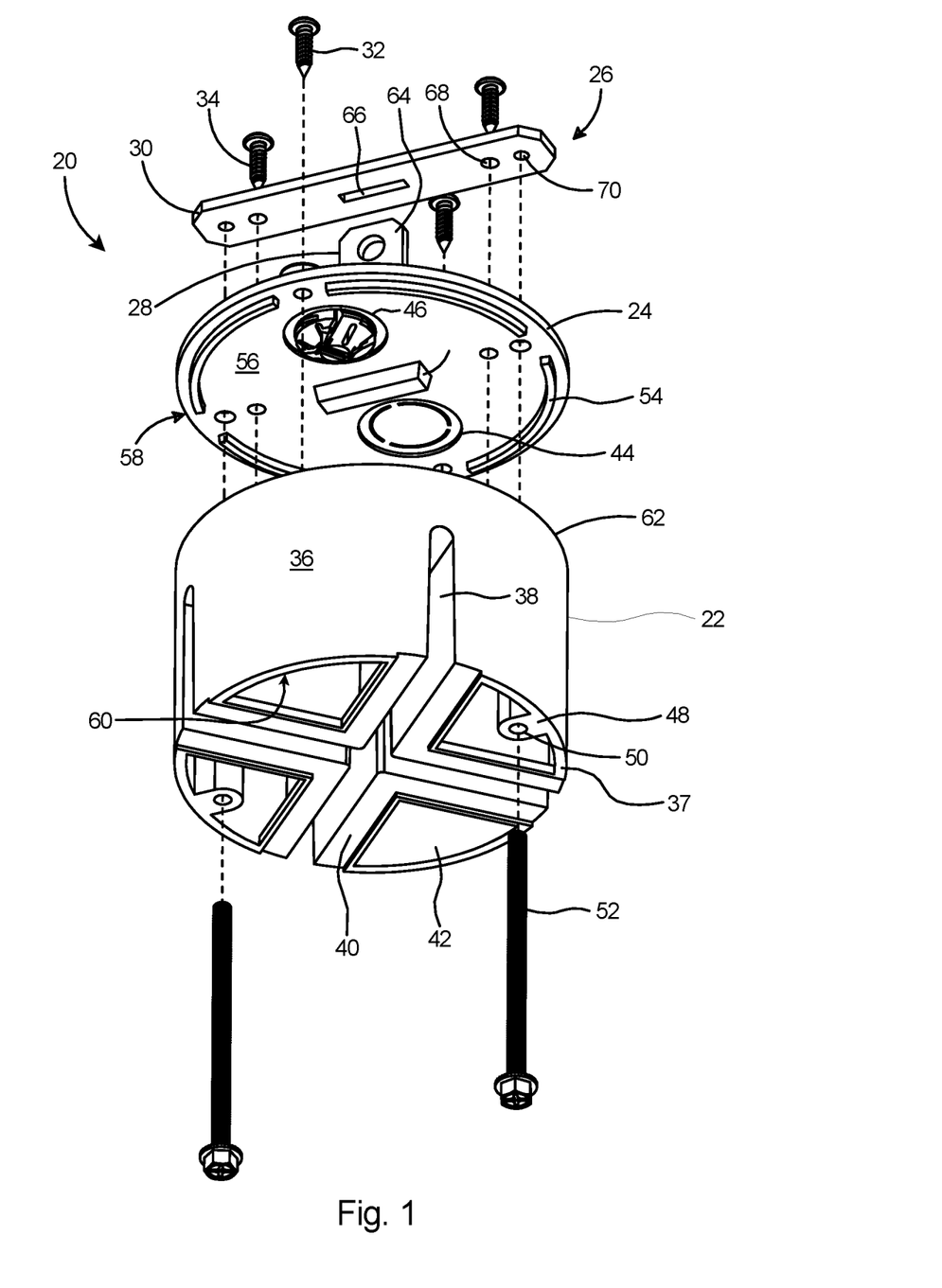
FIG. 1 is an exploded isometric view of an electrical box assembly that mounts over the top of a suspended ceiling T-bar or intersection of T-bar grid to support a fan, fixture, or low-voltage device.
Figure 2:
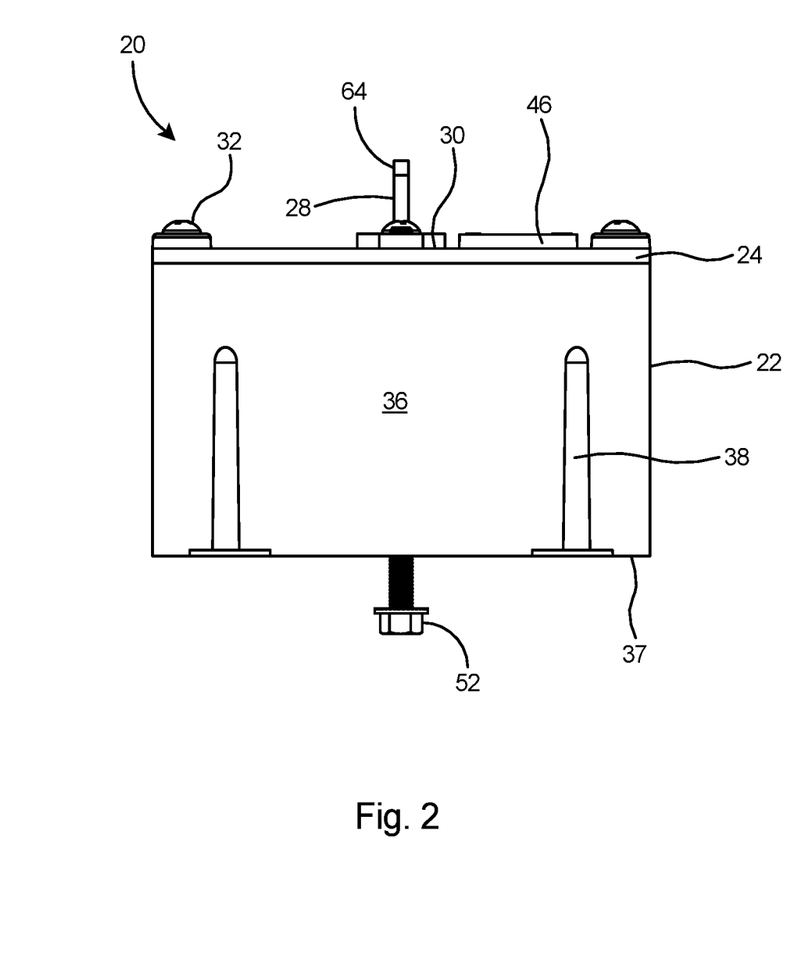
FIG. 2 is a side view of the electrical box assembly of FIG. 1.
Figure 3:
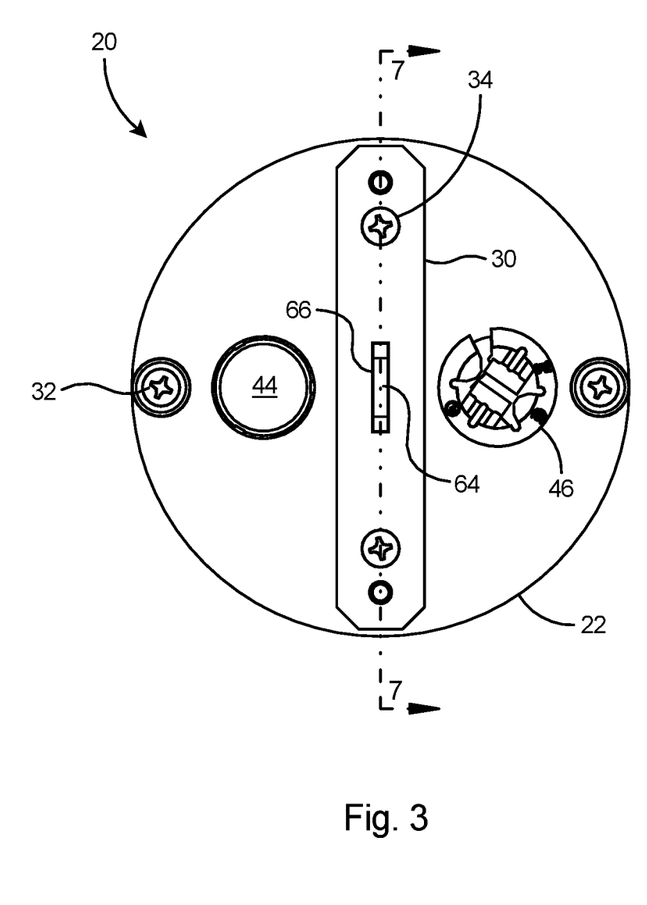
FIG. 3 is a top view of the electrical box assembly of FIG. 1.

With reference to FIG. 1, the present invention is an electrical box assembly that mounts over the top of a suspended ceiling T-bar or over the intersection of a T-bar grid to support a fan, fixture, or low-voltage device.

The electrical box assembly 20 includes an electrical box 22, a lid 24, and a two-piece support bracket 26 including a support tab 28 and a mounting plate 30. Lid fasteners 32 are provided for securing the lid 24 to the electrical box and plate fasteners 34 are provided for securing the mounting plate 30 to the electrical box 22. The electrical box 22 includes a sidewall 36 including a bottom rim 37 and intersecting channels 38 extending through the sidewall 36. The intersecting channels 38 are defined by intersecting channel walls 40 that extend at substantially right angles through the electrical box and divide the open end of the electrical box into wiring cavities 42.

The electrical box 22 includes one or more knockout apertures 44 into which a push-in electrical fitting 46 may be inserted. Bosses 48 within one or more of the wiring cavities 42 include bores 50 for insertion of mounting bolts 52 for attaching a fan, fixture, or other device to the support bracket 26 and electrical box assembly 20. One or more alignment tabs 54 extend from the lower side 56 of the lid 24. The alignment tabs 54 are located at the periphery 58 of the lid and substantially match the circular inner periphery 60 of the sidewall 36 to enable rapid aligning and fitting of the lid 24 to the top 62 of the electrical box 22. The alignment tabs 54 are preferably arcuate in shape. The support tab 28 of the support bracket 26 includes an upward extending wire attachment ring 64. The mounting plate 30 includes a slot 66 for insertion of the wire attachment ring 64. Mounting plate 30 further includes inner apertures 68 and outer apertures 70.

Figure 4:
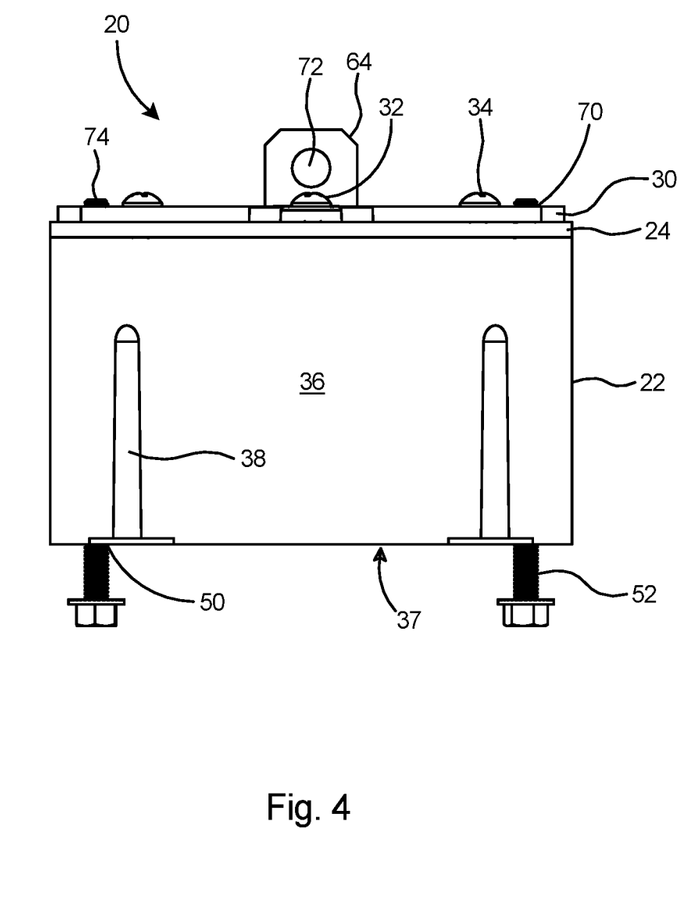
FIG. 4 is a side view of the electrical box assembly in which the view is at a 90° angle from the side view of FIG. 2.
Figure 5:
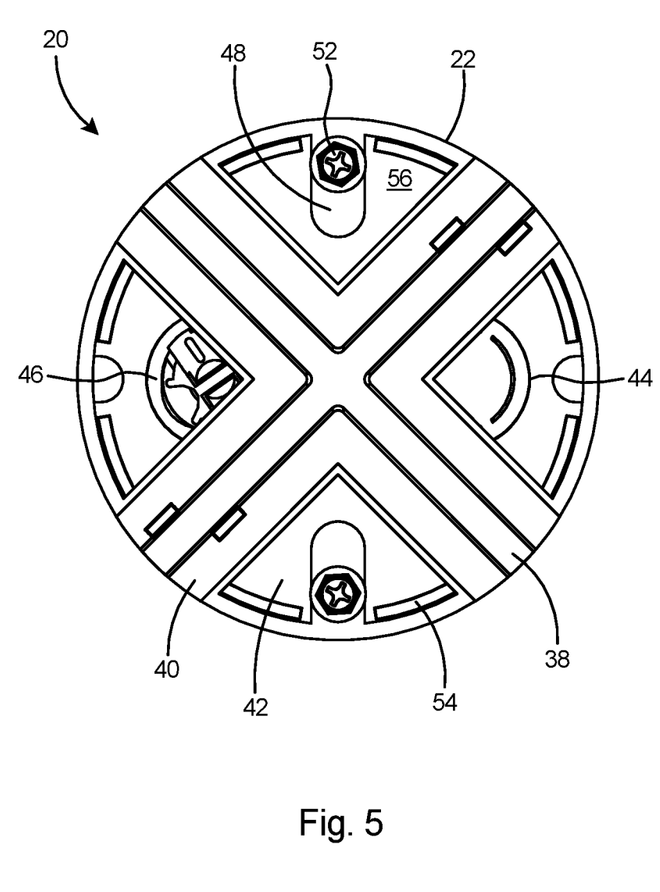
FIG. 5 is a bottom view of the electrical box assembly of FIG. 1.
Figure 6:
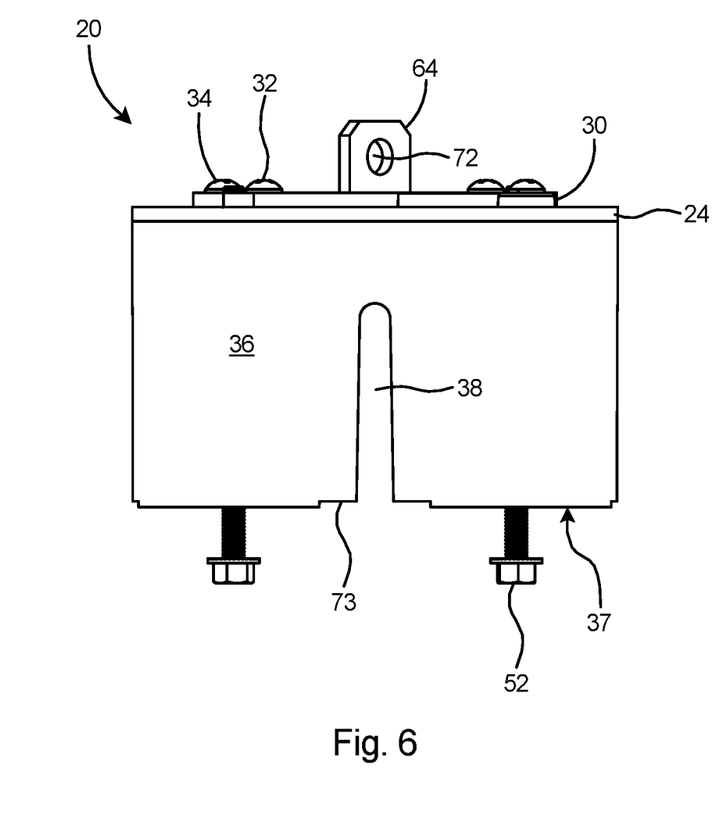
FIG. 6 is a side view of the electrical box assembly from the opposite side of the assembly as shown in FIG. 4.
Figure 7:
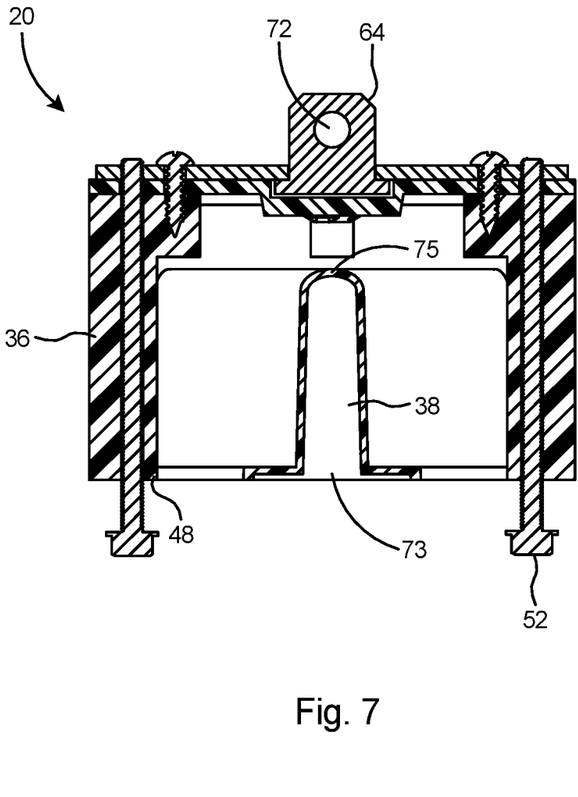
FIG. 7 is a sectional view of the electrical box assembly taken along line 7-7 of FIG. 3.
Figure 8:
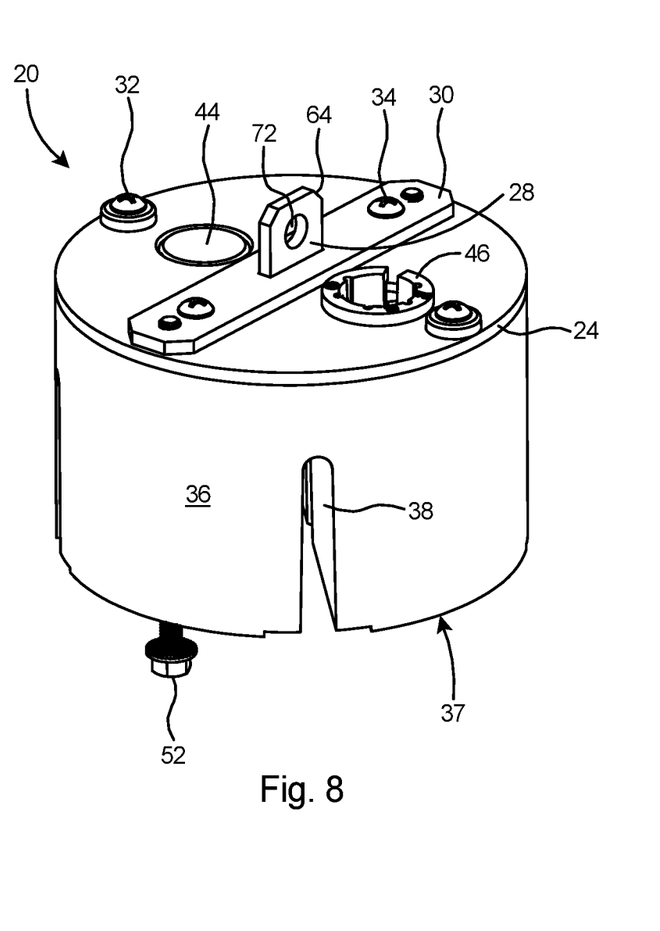
FIG. 8 is a top isometric view of the electrical box assembly.
Figure 9:
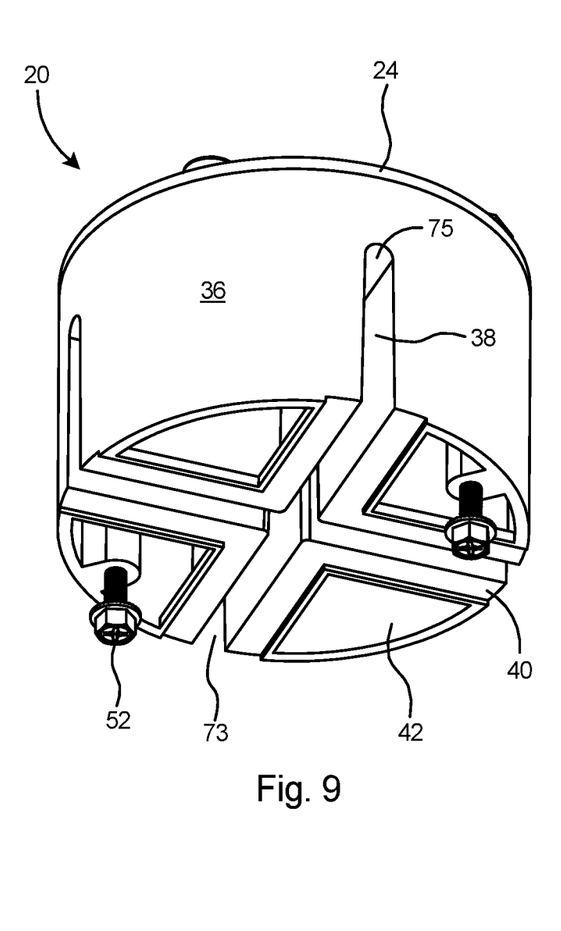
FIG. 9 is a bottom isometric view of the electrical box assembly.

Referring to FIGS. 4 and 5, wire attachment ring 64 includes an aperture 72 therein. Mounting bolts 52 extend through the bores 50 in the bosses 48 of the electrical box 22, through the lid 24, and through the mounting plate 30. As shown in FIG. 4, the ends 74 of the mounting bolts 52 extend through the outer apertures 70 of the mounting plate 30. Most preferably the outer apertures 70 are threaded apertures and mounting plate 30 is preferably constructed of steel. As shown in FIG. 6, the sidewall 36 may include a recess 73 at the entry of each channel 38, the recess 73 providing a wide mouth extending along the length of the channel to accommodate the base (not shown) of a T-bar when fitted thereto. As shown in FIG. 7, each channel 38 includes an open bottom 73 and a closed top 75.

Figure 10:
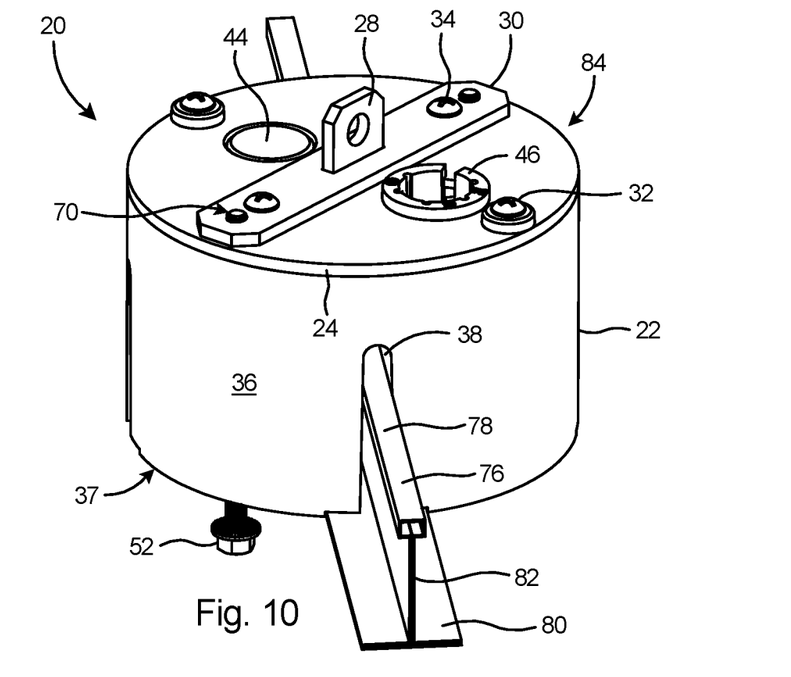
FIG. 10 is a top isometric view of the electrical box assembly mounted to a T-bar.
Figure 11:
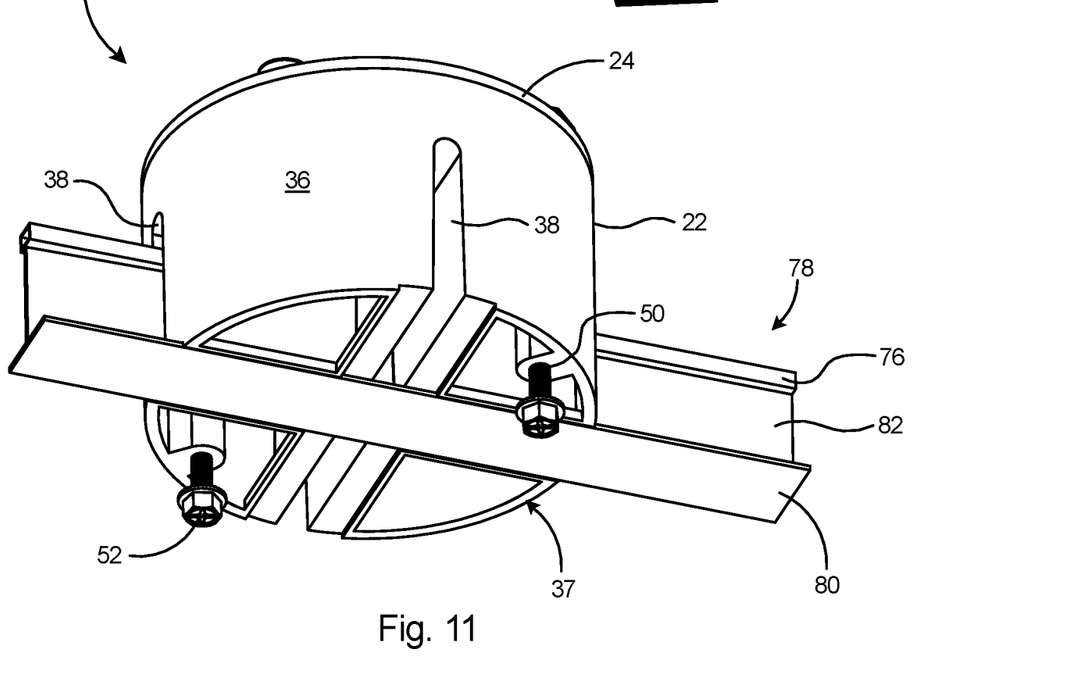
FIG. 11 is a bottom isometric view of the electrical box assembly mounted to a T-bar.

With reference to FIGS. 10 and 11, electrical box assembly 20 is preferably mounted over the top 76 of a suspended ceiling T-bar 78 or over the intersection (not shown) of a T-bar grid to support a fan, fixture, or low-voltage device. T-bar 78 includes the top 76, a base 80, and a vertical rail 82 extending between the base 80 and the top 76. Electrical box 22 is simply located in the desired position on a ceiling by aligning one of the intersecting channels 38 with the T-bar 78 and dropping the electrical box over the T-bar until bottom rim 37 of box 22 contacts the base 80 of the T-bar.

The electrical box assembly 20 may be installed on a straight-away portion of the T-bar 78 or at the intersection of a T-bar grid.

Initially, the lid fasteners 32 may be disconnected from the electrical box assembly 20 and the plate fasteners 34 secure the mounting plate 30 and lid 24 together in a top assembly 84. To provide a pathway for pulling electrical cable into the electrical box 22, one or more knockout apertures 44 may be removed from the lid 24 and an electrical fitting 46 may be slid onto the electrical cable or cables (not shown). The ends of the conductors within the cables may then be stripped and connected to the fan, fixture, or low-voltage device (not shown). The lid fasteners 32 are then tightened to secure the lid 24 to the electrical box 22. Tightening of the lid to the electrical box 22 properly aligns bores 50 (see FIG. 11) of electrical box with outer apertures 70 (see FIG. 10) of mounting plate 30, after which the mounting bolts 52 may be tightened into the steel mounting plate 30 to properly support the weight of the fan, fixture, or low-voltage device (not shown). The installer would then typically run and tension a wire cable (not shown) between the wire attachment ring 64 (see FIG. 4) and an overhead support to properly support the weight of the fan, fixture, or low-voltage device.

Figure 12:
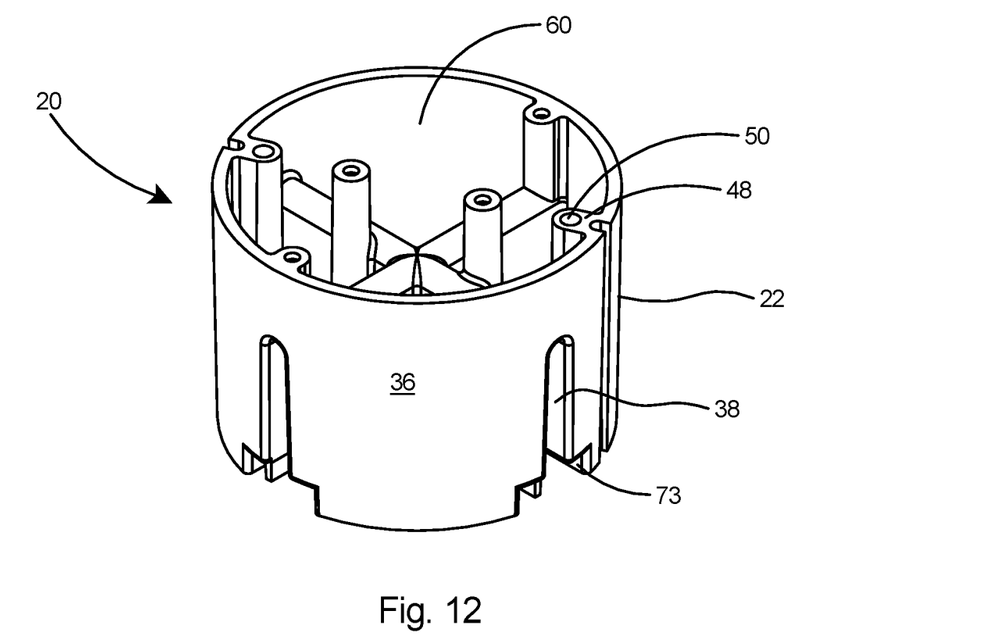
FIG. 12 is a top isometric view of a second embodiment of an electrical box that forms a portion of an electrical box assembly according to the present invention.
Figure 13:
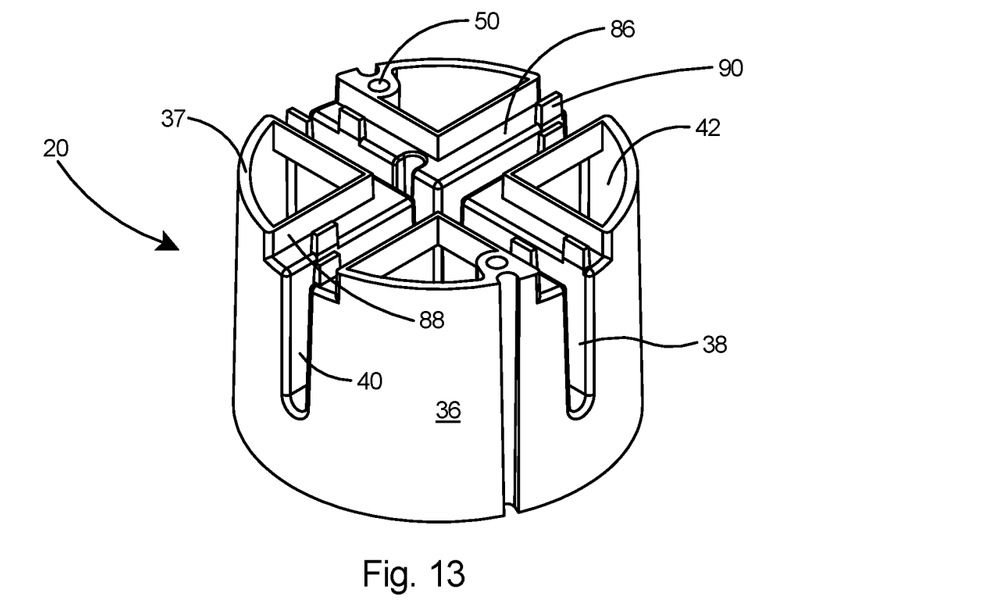
FIG. 13 is a bottom isometric view of the electrical box of FIG. 12.

With reference to FIGS. 12 and 13, the recess 73 at the entry of each channel 38 includes a recess top wall 86 and a recess sidewall 88. Breakaway tabs 90 extend from the recess top walls 86.

Figure 14:
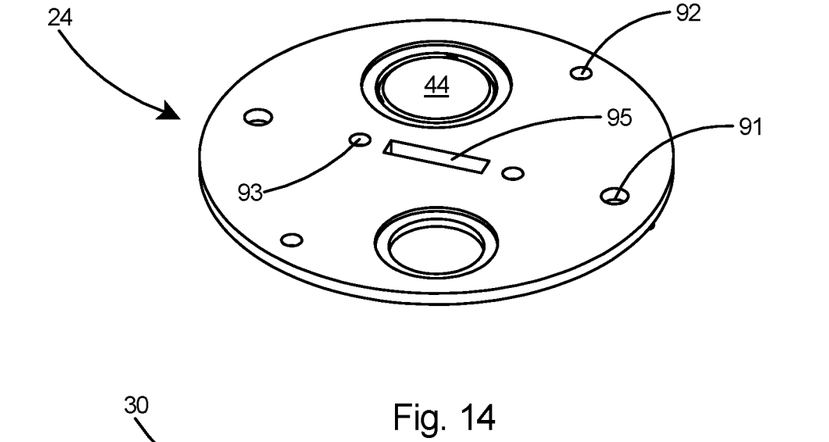
FIG. 14 is a top isometric view of a lid that forms a portion of an electrical box assembly according to the present invention.

As shown in FIG. 14, the lid 24 includes one or more knockout apertures 44, apertures 91 for accepting connection of mounting bolts 52 (see FIG. 1), apertures 92 for accepting lid fasteners 32 (see FIG. 1) for securing the lid 24 to the electrical box 22, and apertures 93 for securing the mounting plate 30 to the lid 24. A groove 95 is provided in the top surface of the lid 24 for seating the support tab 28 (see FIG. 1).

Figure 15:
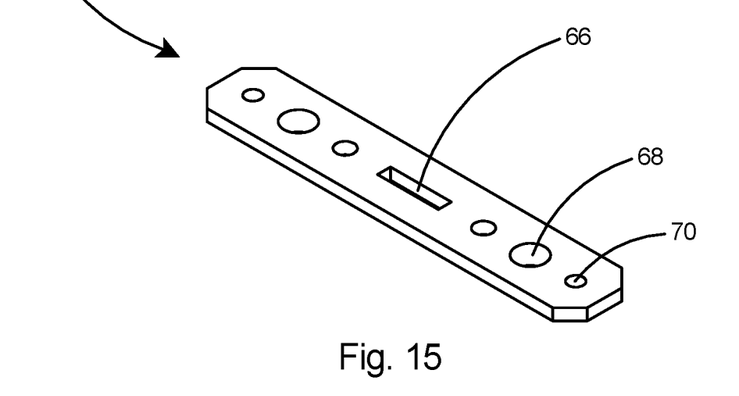
FIG. 15 is an isometric view of a mounting plate that forms a portion of an electrical box assembly according to the present invention.
Figure 16:
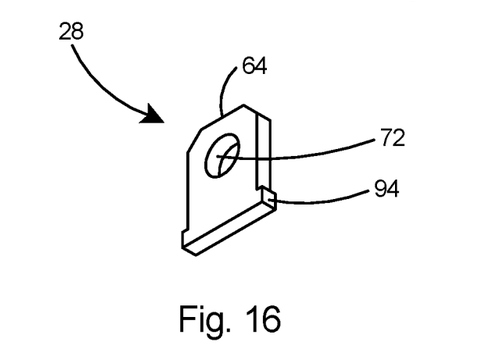
FIG. 16 is an isometric view of a support tab that forms a portion of an electrical box assembly according to the present invention.

Referring to FIGS. 15 and 16, the mounting plate 30 includes the slot 66 for insertion of the wire attachment ring 64 portion of the support tab 28. Mounting plate 30 further includes the inner apertures 68 and outer apertures 70. As shown in FIG. 16, support tab 28 includes an aperture 72 and a base 94.

Figure 17:
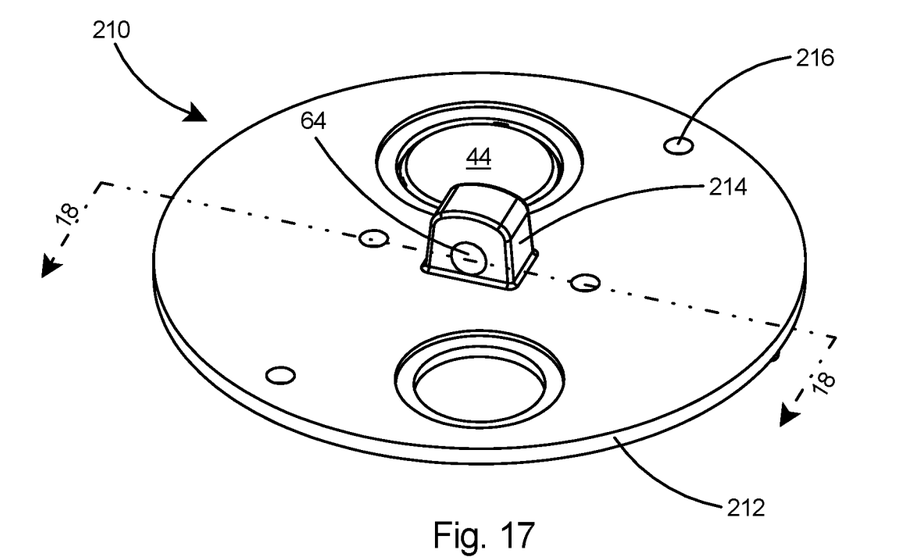
FIG. 17 is an isometric view of a second embodiment of the lid.
Figure 18:
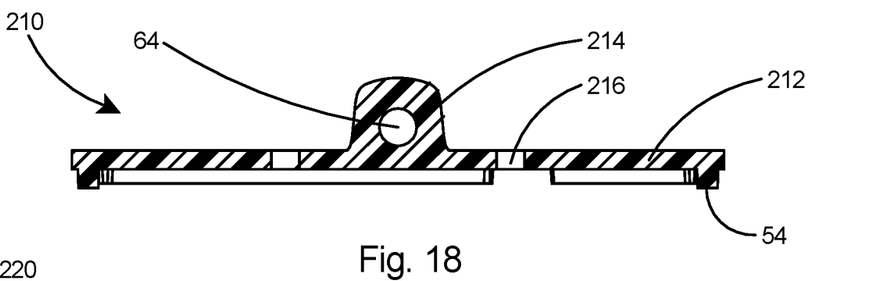
FIG. 18 is a sectional view of the lid taken along line 18-18 of FIG. 17.

With reference to FIGS. 17 and 18, a second embodiment of the lid 210 includes plate 212 and a support tab 214 that is integral with the plate 212. Apertures 216 are provided in plate 212 to accommodate lid fasteners 32 (see FIG. 1) for securing the lid to the electrical box 22.

Figure 19:
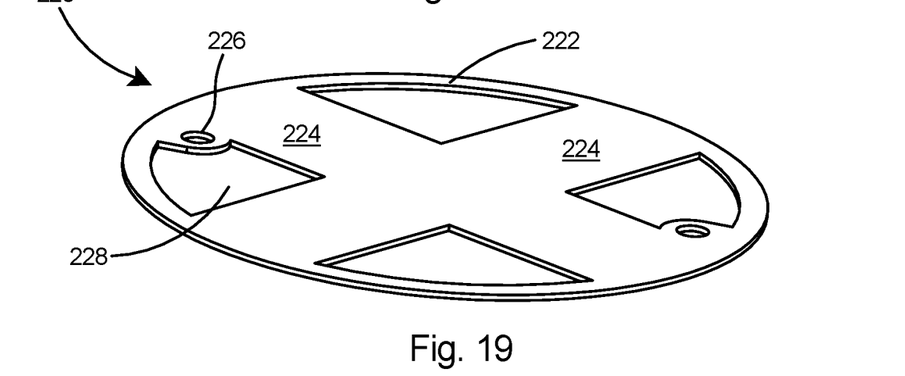
FIG. 19 is an isometric view of a cover plate.

Referring to FIG. 19, a cover plate 220 is provided for covering the open end of the electrical box. The cover plate 220 includes an outer ring 222 for fitting flush against the bottom rim 37 (see FIG. 1) of the electrical box, a two panels 224 extending across and planar with the outer ring 222, and one or more apertures 226 for accommodating pass-through of the mounting bolts 52 (see FIG. 1). The crossing panels 224 form openings 228 in the cover plate 220. Each of the openings 228 in the cover plate 220 align with a corresponding wiring cavity 42 (see FIG. 1) of the electrical box 22. The cover plate 220 is inserted between the bottom rim 37 of the electrical box and the mounting plate of the fixture or fan manufacturer (not shown) to enable the panels 224 of the cover plate to close off the open ends of the wiring cavities 42.

Figure 20:
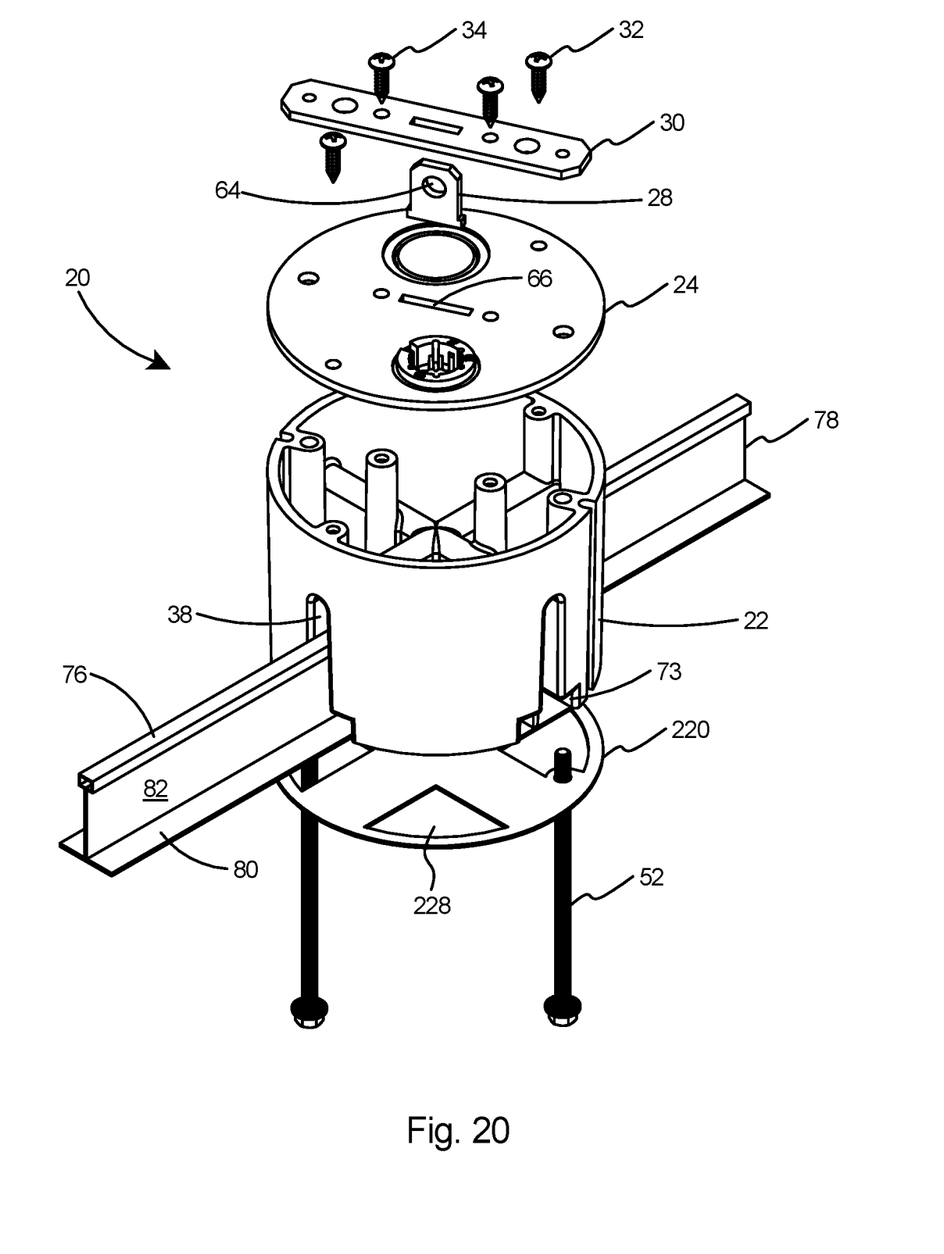
FIG. 20 is an exploded isometric view of an electrical box assembly according to the invention.

Referring to FIG. 20, the electrical box assembly 20 is typically supplied with the support tab 28, mounting plate 30, and lid 24 assembled to the electrical box 22. The electrical box assembly 20 can be installed on a straight-away portion of a T-bar 78 or at the intersection of two T-bars. To operate the invention, first determine the desired location and cut the ceiling tiles (not shown) as required. The fan box assembly 20 can be installed on a T-rail with the breakaway tabs 90 in place for a conventional suspended ceiling. Alternatively, the fan box assembly 20 can be adjusted for use with premium/reveal edge ceiling tiles, in which the lower portion of the ceiling tiles extend below the base 80 of the T-rail 78, by removing the breakaway tabs 90 (see FIG. 13). If necessary, pliers or similar tools can be used to remove the tabs.

After pressing the fan and fixture box 20 onto the T-rail, locate a structural member directly above the box location and install a drop wire support (not shown) to the wire attachment ring 64. The fan and fixture box must be supported independent of the suspended ceiling grid. Non-metallic cable may be installed in the box using a non-metallic connector, such as the BLACK BUTTON® available from Arlington Industries, Inc., Scranton, Pennsylvania. Place the cover plate 220 between the ceiling grid and the manufacturer's fan support bracket (not shown). Reinstall any ceiling tiles that were removed. A ceiling fan (not shown) may then be installed to the assembly using the manufacturer-supplied fan support bracket per the fan manufacturer's instructions. The mounting bolts 52 are screwed through the electrical box 22 into the mounting plate 30, enabling the box assembly 20 to support either a fixture or a fan.

Figure 21:
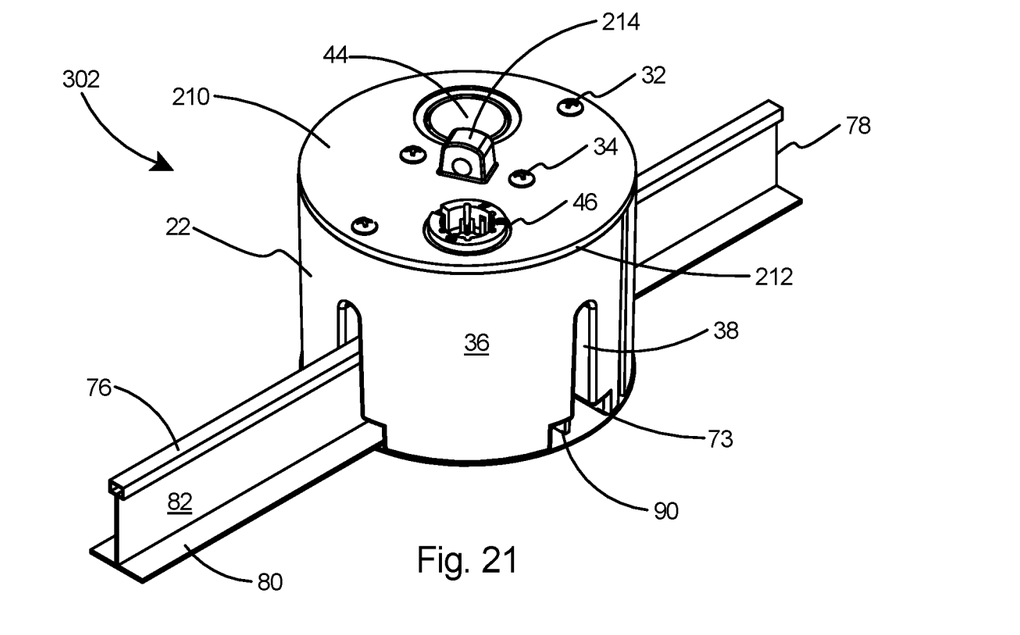
FIG. 21 is a top isometric view of a second embodiment of the electrical box assembly assembled onto the T-rail of a suspended ceiling.
Figure 22:
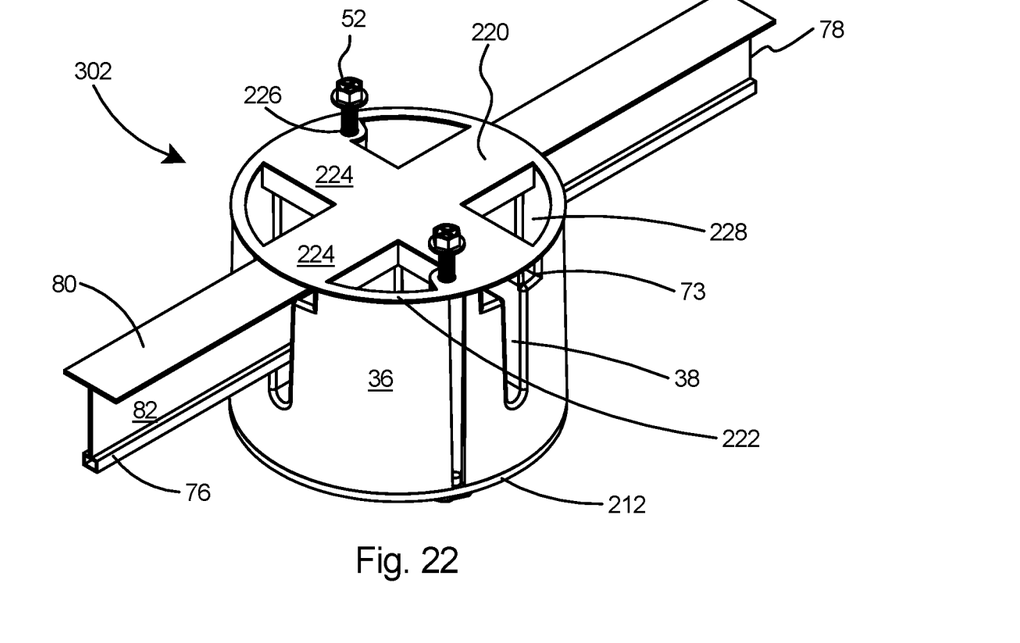
FIG. 22 is a bottom isometric view of the second embodiment of the electrical box assembly assembled onto the T-rail of a suspended ceiling.

With reference to FIGS. 21 and 22, there is shown a second embodiment of the box assembly 302, a fixture box, assembled onto the T-rail 78 of a suspended ceiling grid. The fixture box 302 is assembled to the T-rail 78 or T-rail intersection in the same manner as the fan and fixture box described hereinabove.

With reference to the fan and fixture box 20 in FIG. 20, the mounting plate 30 and support tab 28 are most preferably constructed of steel and the electrical box 22 and lid 24 are preferably each molded of plastic. For the fixture box 302 of FIGS. 21 and 22, the electrical box 22 and lid 210 are most preferably each molded of plastic, with the support tab 214 and lid 210 being molded in one piece.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical box assembly for suspended ceilings comprising:
   an electrical box including a sidewall, a top end, and a bottom rim;
   a lid secured to said top end of said electrical box;
   a support tab including a wire attachment ring on said lid;
   a channel extending through said sidewall at said bottom rim, said channel to engage the T-bar of a ceiling grid;
   a recess in the sidewall of the box at the bottom rim;
   said recess including a recess top wall and a recess side wall; and
   one or more breakaway tabs on said recess top wall.

2. The electrical box assembly of claim 1 wherein said channel comprises:
   an open bottom; and
   a closed top.

3. The electrical box assembly of claim 1 comprising two of said channels.

4. The electrical box assembly of claim 3 comprising said channels intersecting at a substantially 90 degree angle.

5. The electrical box assembly of claim 4 comprising said intersecting channels separate said electrical box into a plurality of wiring cavities.

6. The electrical box assembly of claim 5 comprising a cover plate to cover the electrical box at said bottom rim.

7. The electrical box assembly of claim 6 wherein said cover plate comprises:
   an outer ring to fit flush against the bottom rim of the electrical box; and
   one or more panels extending across the cover plate to form openings in said cover plate wherein each of said openings align with one of said plurality of wiring cavities in said electrical box.

8. The electrical box assembly of claim 1 comprising:
   one or more bosses on said electrical box sidewall; and
   a bore in each of said bosses.

9. The electrical box assembly of claim 1 further comprising a mounting plate to secure to said lid.

10. The electrical box assembly of claim 9 comprising:
    a base on said support tab; and
    a slot in said mounting plate to engage said base of said support tab; and
    said base of said support tab to stop travel of support tab through said slot.

11. The electrical box assembly of claim 9 comprising:
    apertures in said mounting plate;
    mounting bolts to secure the electrical box to the lid and mounting plate.

12. The electrical box assembly of claim 1 comprising one or more alignment tabs on said lid.

\* \* \* \* \*